Patented June 25, 1940

2,205,438

UNITED STATES PATENT OFFICE 2,205,438

ADHESIVE ABRASIVE COMPOSITION

Henry O. Richter, Worcester, Mass., assignor to Norton Company, Worcester, Mass., a corporation of Massachusetts No Drawing. Application February 25, 1936, Serial No. 65,662

1 Claim. (Cl. 51—280)

The invention relates to adhesive abrasive compositions, and with regard to its more specific features to an abrasive containing paint which can readily be applied and will adhere to a metal or wooden surface or the like.

One object of the invention is to provide a convenient manner of rendering a metallic or wooden floor surface non-slip. Another object of the invention is to provide a composition adapted to facilitate the ready coating of a metal plate or the like with an abrasive surface. Another object of the invention is to provide a composition for and a manner of coating a metal disk with abrasive so that it may be used where abrasive paper covered disks are now employed, as for woodworking and the like. Another object of the invention is to provide a binder for abrasive particles having a high affinity and adhesion to many substances, including metals, wood, paper, cloth and the like. Another object of the invention is to provide a binder for the preparation of abrasive paper and abrasive cloth. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claim.

I provide a quantity of abrasive grain of any desired material and particle size. Any known abrasive material may be used, for example, diamond, aluminum oxide, silicon carbide, other metal carbides, quartz and garnet, and the abrasive may be either artificial as an electric furnace aluminum oxide, or it may be natural as emery, corundum or garnet.

I provide as an adhesive an emulsion of asphalt. This may be prepared as follows:

Taking 87 parts of asphalt, 9 parts of stearic acid, 4 parts of triethanolamine and 400 parts of water, put the water in a container which can be heated, then add the triethanolamine while stirring and thereafter add the stearic acid. Heat the mixture and stir which will produce a smooth soaplike solution. Raise the temperature to just below the boiling point.

The asphalt is now melted in a separate container and its temperature is brought to in the neighborhood of 85° to 95° C. The asphalt is now added to the solution and the entire mass is stirred vigorously to obtain a good emulsion. Stirring should be continued gently until the product has cooled.

Either the natural asphalt or that which comprises a residue from the petroleum refining industry can be used according to the invention. Asphalt is a bituminous mixture of hydrocarbons and complex derivatives, and the natural asphalt is found in Trinidad. It may be readily procured almost anywhere and the commercial variety is satisfactory for carrying out the present invention.

Taking now a quantity of the desired abrasive grain, and a quantity of the emulsified asphalt, I mix them together to brushing consistency. This may readily be determined by any one familiar with painting with a brush, for enough emulsified asphalt should be used so that the mixture is fluid enough to be applied with a brush, and the quantity of abrasive grains should be sufficient so that the mixture will not flow too readily and also to provide a substantial surfacing of abrasive grains as the mixture is used.

Taking a mixture of grains and emulsified asphalt as specified, which mixture has been newly prepared or kept in a closed container to prevent undue evaporation of water, I apply the mixture with a paint brush as one may apply any ordinary paint, forming a coating of the mixture upon the surface to be treated. It is preferable, if a metal surface is being treated, to use a primer upon the surface before applying the mixture. After a reasonable time for drying, the asphalt hardens and adheres to the surface treated and the abrasive grain is found to be embedded therein and firmly attached to the substance which was painted.

Cast iron, steel or any metal may be coated with abrasive by brushing on the mixture hereinbefore specified, and wood may also be treated in the same manner. Thus the invention provides a ready manner of forming a non-slip surface on metal stairs, or iron floors such as are to be found on ships. Wooden stairways may also be made non-slip and safe by brushing on the mixture of the invention.

In the woodworking trades it is customary to mount a steel or cast iron disk on a spindle together with means for rotating the spindle, then to secure a coating of abrasive paper to the disk by means of any suitable cement. Wood may be very rapidly shaped by bringing it against the abrasive paper while the disk is rotating. According to the present invention I may paint such a cast iron or steel disk with the hereinbefore defined mixture and the disk may readily be resurfaced from time to time to renew its abrasive properties.

It will thus be seen that there has been provided by this invention a composition in which the various objects hereinabove set forth together with many thoroughly practical advantages are successfully achieved. As various possible embodiments might be made of the features of the above invention and as the art herein described might be varied in various parts, all without departing from the scope of the invention, it is to be understood that all matter hereinbefore set forth is to be interpreted as illustrative and not in a limiting sense.

I claim:

A composition of matter comprising an emulsion of asphalt and water carrying grains of abrasive of the group consisting of crystalline alumina and the abrasive metal carbides and wherein said ingredients are so proportioned that the mixture consists substantially solely of abrasive grains suspended in a bond consisting substantially of an asphalt emulsion and has a low viscosity and the consistency of a brushing paint and so is capable of application to a surface by means of a paint brush.

HENRY O. RICHTER.